United States Patent [19]

Alexander

[11] Patent Number: 4,847,226
[45] Date of Patent: * Jul. 11, 1989

[54] PROCESS FOR EXTRUDING AND ACID TREATING CLAY FOR IMPROVED FILTRATION

[75] Inventor: William Alexander, Naperville, Ill.

[73] Assignee: American Colloid Company, Arlington Heights, Ill.

[*] Notice: The portion of the term of this patent subsequent to May 23, 2006 has been disclaimed.

[21] Appl. No.: 7,713

[22] Filed: Jan. 28, 1987

[51] Int. Cl.$^4$ .......................... B01J 20/12; B01J 21/16
[52] U.S. Cl. ....................................................... 502/83
[58] Field of Search .............................. 502/81, 82, 83

[56] References Cited

U.S. PATENT DOCUMENTS 2,470,872  5/1949  Secor ..................................... 502/81
2,967,156  1/1961  Talvenheimo ........................ 502/82

FOREIGN PATENT DOCUMENTS 511409   3/1955  Canada ................................... 502/82
722150  11/1965  Canada ................................... 502/81
939938  10/1963  United Kingdom ................. 502/82

Primary Examiner—Carl F. Dees
Attorney, Agent, or Firm—Mason, Kolehmainen, Rathburn & Wyss

[57] ABSTRACT

A method of extruding clay and then treating the clay with acid to beneficiate the clay for increased capacity of filtration of oil-soluble colorant compounds from oil. The clay is first extruded through one or more die openings to align some of the clay platelets and to form the clay into cylindrical pellets. The extruded clay pellets are then acid treated, either before or after grinding, in an aqueous acid solution to form an acid slurry of the clay. The acid slurry of the clay is agitated for a time sufficient and at a temperature sufficient so that the acid reacts with a portion of the clay and, thereafter, the acid treated clay is separated from the acid solution; the clay then is washed to remove most of the acid solution from the clay; filtered and thereafter dried.

15 Claims, No Drawings

PROCESS FOR EXTRUDING AND ACID TREATING CLAY FOR IMPROVED FILTRATION

FIELD OF THE INVENTION

The present invention is directed to a process for beneficiating the contaminant filtration characteristics of clay by extruding the clay through one or more die openings prior to acid treating the clay. The extruded, acid treated clay is used for filtration of contaminant coloring compounds found in vegetable oils, animal fats, mineral oils, petroleum fractions, or any other liquids containing colorant contaminants and are unexpectedly superior to acid treated clays which have not been extruded prior to acid treatment.

BACKGROUND OF THE INVENTION AND PRIOR ART

It is well known that many naturally occurring clays may be acid treated to enhance their ability to decolorize oils. One of the most common clays used in this field is bentonite clays, particularly the non-water swelling bentonite clays such as calcium and magnesium bentonites. These acid activated bentonite clays are used for decolorizing or bleaching of various oils such as mineral oils, vegetable oils, various fractions from petroleum, especially lubricating oils, and the refining of used lubricating oils, and purification of melted animal fats and beeswax.

In the early 1900s, it was discovered that the bleaching power of clays such as bentonite could be enhanced far better than the bleaching power of the best crude clays in use at that time provided that the clay was first treated with a mineral acid such as hydrochloric or sulphuric acid and washed substantially free of dissolved salts and residual acid. The general process of acid activation of clays, as used today in industry, includes grinding the clay for uniform activation and dispersion in water; slurrying the ground clay in water and then adding acid to the clay slurry in an attempt to achieve a substantially uniformly activated clay. Usually about 6 to 8 hours of acid digestion is necessary to properly acid activate the clay. The digested slurry then is washed substantially free of dissolved salts such as iron and aluminum sulfates or chlorides, depending upon the particular mineral acid used. The acid activated clay then is dewatered, such as by filtration, and the resulting filter cake is dried and subsequently ground to product specifications.

The following patents describe various processes for treatment of clay to enhance the filtering characteristics of the clay in the removal of colorizing compounds: U.S. Pat. Nos. 1,408,655; 1,524,843; 1,408,656; 1,402,112; 1,544,210; 1,731,702; and 1,739,734. Each of these processes for acid treating clay is useful in accordance with the principles of the present invention as well as the process disclosed in this assignee's prior, copending application Ser. No. 815,704 filed Jan. 2, 1986, which application is hereby incorporated by reference.

SUMMARY OF THE INVENTION

In brief, the present invention is directed to a method of treating clay to beneficiate the clay for increased capacity of filtration of oil-soluble colorant compounds from oil by first extruding the crude clay, generally having a moisture content of about 20–40% by weight, through one or more die openings, to form clay pellets, and thereafter acid treating the clay. The extruded clay can be acid treated in the form of pellets and thereafter dried and ground to a predetermined particle size distribution or the clay pellets can be ground prior to acid treatment.

In accordance with one embodiment of the present invention, the extruded clay, before or after acid treatment, is ground to a particle size distribution such that more than 50% by weight of the clay, on a dry basis, passes through a 200 mesh screen and less than 5% by weight of the clay, on a dry basis, is finer than 5 microns. Any method of extrusion and acid treatment are suitable in accordance with the principles of the present invention. In accordance with one embodiment of the present invention, after extrusion, the extruded clay is directly contacted with an acid solution to form an acid slurry of the clay. The extruded acid treated clay slurry is agitated for a time sufficient and at a temperature sufficient so that the acid reacts with a portion of the extruded clay and thereafter the acid treated clay is separated from the acid solution; the clay then is washed to remove most of the acid solution from the clay; filtered to a liquid content less than about 60% by weight and thereafter dried, for example, to a liquid content less than about 20% by weight.

Accordingly, an object of the present invention is to provide a process for the treatment of clay to increase the capacity of the clay for filtering colorant compounds and other contaminants from liquids, such as oils.

Another object of the present invention is to provide a new and improved process including extruding clay to partially align and break up the clay platelets and thereafter acid treating the clay to beneficiate the clay for filtration of colorant compounds and other contaminants from liquids.

Another object of the present invention is to provide a new and improved process for extruding and thereafter acid treating clay by contacting extruded clay directly with an acid solution, without first dispersing the clay in water, while mechanically, gently agitating the clay in the acid solution to prevent further reduction of the clay particle size.

A further object of the present invention is to provide a new and improved process for extrusion and acid treatment of clay wherein, after extrusion, the clay is initially ground to a particle size so that more than 50% of the clay particles pass through a 200 mesh screen and less than 5% of the clay particles are less than 5 microns in size and initially contacting the ground clay with an acid solution containing 10–35% by weight acid while the clay is relatively dry (less than 20% by weight water) such that initial hydration of the clay in the acid solution causes diffusion of acid, with the water, into the inner pores of the partially broken away clay platelets resulting from extrusion to more effectively acid activate the clay particles throughout.

Still another object of the present invention is to provide a new and improved process for the extrusion and then acid activation of clay to provide a clay having excellent color filtration properties with a relatively small percentage of clay fines, e.g., finer than 10 microns, while providing better acid activation, due to extrusion, with relatively little agglomeration of particles, thereby providing a more effective and more compact filtration medium having substantially more surface area for colorant filtration thereby providing faster and easier washing and filtration of the acid activated clay during processing.

Another object of the present invention is to provide a new and improved method of treating clay by extrusion to partially separate the clay platelets followed by acid activation to beneficiate the filtration characteristics of the clay by providing proper grinding of the clay to prevent a substantial portion of fine particles less than about 5 microns, and contacting the extruded ground clay particles while in relatively dry form with an acid solution containing hydrochloric acid at a concentration of about 10 to about 25% by weight, or sulphuric acid at a concentration of about 12 to 35% by weight to fix the particle size of the clay and provide immediate diffusion of acid into the interstices of the partially separated clay particles.

Another object of the present invention is to provide a new and improved method of acid activating clay particles by heating the extruded clay particles in ground or pellet form in acid solution to achieve faster mass transfer between the clay and the acid solution and to achieve faster washing and filtration of the acid activated clay particles during processing. When the clay is acid activated in pellet form, the clay is ground after acid activation to provide a desired particle size distribution.

Still another object of the present invention is to provide a new and improved method of acid activating clay including extruding the clay and thereafter grinding the clay particles and contacting the ground clay particles with an acid solution at a clay moisture content of less than about 20% by weight, such that hydration of the clay particles diffuses acid into the inner portions of the extruded, ground clay particles thereby substantially fixing the particle size distribution of the clay particles.

The above and other objects and advantages of the present invention will become apparent from the following detailed description of the preferred embodiment.

DETAILED DESCRIPTION OF THE PREFERRED EMBODIMENT

The process of the present invention is useful with any of the clays known to be used in bleaching or decolorizing by filtration, such as any of the bentonites, including swelling bentonites such as sodium bentonites or the non-swelling bentonites such as calcium magnesium bentonite. The process is also useful for clays dominated by high contents of smectite type clay minerals, such as any of the montmorillonites, nontronite and saponite, illite and hydrous-mica types of clay minerals, halloysite, and slaking-type bentonites. The process does not appear to be useful on kaolinite dominated clay deposits. The resulting extruded and acid activated clays are unexpectedly superior in bleaching or decolorizing capability and in ease and speed of filtration and washing to acid activated clays which have not been extruded prior to acid activation.

In accordance with a preferred embodiment of the present invention, the raw material is derived from the so-called sub-bentonite or slaking-type bentonites which contain high levels of smectite clay, such as montmorillonite, nontronite, saponite or beidellite clay minerals wherein the predominant base exchange ions are calcium and/or magnesium ions and/or hydrogen ions. Sodium bentonite is composed of layers, sheets or platelets (crystals) with the exchangeable cation occurring between the layers. The layers (crystals) are randomly oriented in crude clay particles. Extrusion, such as disclosed in the Simons U.S. Pat. No. 2,231,328, has been used to rupture the structure of the clay particle while the clay particles are moist by subjecting the particles to sufficient shear forces, thereby breaking the clay particles along various randomly oriented shear planes corresponding to the flat plate structure of the bentonite particles.

In accordance with the present invention, it has been found, unexpectedly, that by extruding the clay through one or more die openings prior to acid activation the bleaching capacity of the acid activated clay is substantially improved by first aligning the flat plates of the clay structure in parallel relationship perpendicular to the axis of the die opening and breaking apart some of the clay platelets for more efficient and effective acid activation. Apparently, it is this alignment that separates flat clay plates from each other to produce the unexpected increase in acid activation effectiveness discovered in accordance with the present invention.

The clay thus extruded in accordance with the present invention, exits from the die opening in pellet form having some of the flat plates of the clay structure aligned perpendicular to the longitudinal axis of the pellet and partly separated. The pellets break off from the exit end of the die opening when the pellet increases in length sufficiently to provide enough weight that the pellet breaks at the die opening exit due to the increasing pellet weight.

The extrusion of the clay, prior to acid activation in accordance with the present invention is conveniently carried out by using either a pug mill or auger extruder. Pug mills have been commonly used in the production of bricks and other ceramic materials. In general, conventional pug mills include a tubular housing having one end open for receiving clay materials and the other end closed with an exit or die for extruding the clay material therethrough. The extruder may include cutting blades as disclosed in this assignee's prior U.S. Pat. No. 4,462,470, although the cutting blades are not necessary to achieve the new and unexpected acid activation effectiveness and unexpected ease in filtration and washing. The amount or intensity of shearing forces imparted by the extrusion, in accordance with the present invention, readily may be varied by changing the feed rate of bentonite, or the size of the extruding or die opening. Also, the rotation speed of the central axis driving the mixing or auger blades may be varied to change shearing forces. The particular operating conditions and pug mill dimensions may be varied widely.

Application of shear pressure forces also conveniently may be applied utilizing a conventional auger extruder. Auger extruders are similar to pug mills except that the central rotating axis has a single or double screw type mixing blade which, when rotated in the appropriate direction, mixes and conveys the bentonite toward and then through one or more die openings at the extruding end of the extruder housing. As with the pug mill, the particular dimensions, including the extruder port or die hole size and shape and operating conditions, may be varied widely to provide the bentonite with differing degrees of clay platelet alignment and separation.

The most convenient way to regulate the degree of clay platelet alignment on the bentonite is to change the size of the exit or extruder port. By varying the amount or flow rate of bentonite flowing through the extruder port, the degree of clay platelet alignment and separation can be regulated to desired levels.

Generally, the moisture content of the clay should be in the range of 15-40% by weight when the clay is extruded. If the clay is too dry, it would be forced through the die openings in a powdery form without sufficient platelet alignment and separation and, therefore, insufficient improvement in removal of oil-soluble colorant compounds. If too wet when extruded, the clay becomes very sticky and may very well clog the extruder.

As mined, bentonite generally contains anywhere from 20 to 40 or 45% water. In accordance with one embodiment of the present invention, the extruded bentonite pellets are dried so that it only contains 5 to 20 weight % moisture and thereafter it may be acid activated in pellet form or it may be ground to a desired particle size prior to acid activation.

Most known clay deposits in the United States contain about 30% or more water and are mined in the form of large, irregular chunks of soft, dense material difficult to grind or pulverize. The large chunks of clay generally are passed through a large dry-pan crusher to divide the chunks into a coarse granular product having a maximum particle size of about 2 centimeters. This material is more easily transported and charged to an appropriate drier for removal of the moisture to a level of about 8 to about 20% by weight water. The material can be dried to a moisture content less than about 8% by weight but further drying is uneconomical and unnecessary.

In accordance with an important feature of the present invention, when the clay is ground after extrusion prior to acid activation it has been found that the clay material, after extrusion and prior to grinding to an appropriate particle size distribution, should not have a moisture content greater than about 20% by weight in order to achieve grinding to the appropriate particle size distribution. In accordance with one important embodiment of the present invention, the extruded clay pellet material, pre-dried to 20% by total weight or less moisture is ground, before or after acid activation, to a particle size of about 10 to about 400 microns with most of the particles being in the range of 10-100 microns. In accordance with an important feature of this embodiment of the present invention, the clay particles should be ground such that more than 50% of the resulting particles pass through a 200 mesh screen and 5% or less of the particles are finer than 5 microns. To achieve the full advantage of this embodiment of the present invention, less than 1% of the ground clay particles should be finer than 5 microns.

It has been found, in accordance with the principles of one embodiment of the present invention, that grinding such that at least 95%, dry weight basis, of the ground clay particles have a particle size in the range of 5 to 400 microns; wherein less than 2% of the clay particles, dry weight basis, have a particle size greater than 400 microns and less than 3%, dry weight basis, have a particle size less than 5 microns, provides for unexpected ease in filtration, washing and bleaching effectiveness. In accordance with a preferred embodiment, proper grinding of the extruded clay, before or after acid activation, coupled with contact of the ground, dry (less than 20% water) clay particles with an acid solution containing 10-35% by weight acid enables the clay particles to be fixed in particle size distribution proportional to that achieved in the grinding process while achieving an acid activated clay having substantially faster absorption of acid and substantially faster filtering and washing characteristics during processing.

In accordance with a preferred embodiment of the present invention, after extruding the clay, as described above, the clay pellets or appropriately ground clay particles having less than 20% by weight water, are then gradually added, in their pre-dried form, to an agitated solution of acid, at an initial temperature of about 25° to 75° C., and thereafter heated to 80° to 100° C. for complete acid activation, having an acid concentration of 10-35% by weight to achieve relatively fast diffusion of the acid into the pores of the ground clay particles. It is understood that any method of acid activation of clay is unexpectedly improved by extruding the clay prior to acid activation in accordance with the present invention. The particular acid in the acid solution is not critical and may be sulphuric, hydrochloric, nitric, phosphoric, or any other acid in the art.

In accordance with an important feature of the preferred embodiment of the present invention, the acid, determined on a 100% acid basis, should be included in the activation solution in an amount of 10 to 35% by weight acid and, to achieve the full advantage of the present invention, the acid concentration will vary depending on the acid in solution. It has been found that hydrochloric and nitric acids, when used as the acid for the acid activation solution, should be present in the solution in an initial concentration in the range of 10 to 25% by weight acid and usually in the range of about 12 to 20% by weight acid. Best results with hydrochloric or nitric acids are achieved at an acid concentration of about 15% by weight. It has been found that when sulphuric acid is used as the acid in the acid activation solution, the concentration of sulphuric acid should be in the range of 10 to 35% by weight sulphuric acid and generally at a sulphuric acid concentration in the range of 15 to 25% by weight. To achieve the full advantage of the present invention when sulphuric acid is used in the acid activating solution, the sulphuric acid should be included at a concentration of 18 to 22% by weight sulphuric acid with best results being achieved at a sulphuric acid concentration of about 20% by weight.

The initial temperature of the acid activation solution is largely determined by the heat of dilution of the acid, but is generally in the range of about 25° to 75° C. More specifically, for sulphuric acid, it has been determined that the initial temperature of the acid activating solution should be in the range of about 50° to 65° C. and for hydrochloric and nitric acids the initial temperature of the acid activation bath should be in the range of about 30° to about 45° C. to achieve good diffusion of the acid into the interstices of the clay particles while fixing the particle size without breakdown or disintegration of the particles. The conditions for the initial contact of the ground clay particles in the acid activating bath should not create steam since the hydration of the clay particles and steam production within the interstices of the clay particles may cause breakdown and disintegration of the clay particles thereby producing a substantial portion of particles having a size less than 5 microns, causing excessive acid activation of the ultra fines, and slower filtration and washing during the process of the present invention.

When the extruded clay pellets are ground prior to acid activation, the ground clay particles are gradually added to the heated acid activation solution at a rate so that the particles are immediately wetted and dispersed in the acid slurry without forming lumps of partially wetted clay particles. Upon contact of the clay particles with the acid activating solution, the acid hardens the clay particles thereby fixing their size and minimizing their dispersion into ultra-fine particles less than 5 microns so that the particle size of the ground or pulverized raw material is maintained throughout the acid digestion period.

In accordance with an important feature of the preferred embodiment of the present invention, the contact of ground or pulverized clay particles with an acid solution, as opposed to initial dispersion of the ground or pulverized material into water and thereafter adding water to the slurry, produces a sandy material having non-sticky surfaces so that the clay particles do not form agglomerates to the extent that ground clay particles would if initially contacted with water. Accordingly, by initial contact of relatively dry, ground clay particles with the acid solution at a concentration of 10-35% by weight acid, the particle size distribution of the clay is substantially fixed in the grinding or pulverizing process thereby substantially eliminating agglomerates of clay having a tendency to slow the steps of acid diffusion, filtration and washing needed in the acid activation process. Acid digestion is completed when approximately 80 to 90% of the acid has been reacted with the clay minerals and this is easily determined by monitoring the residual free acid in the digestion slurry. Acid activation generally is complete in a period of 6 to 8 hours and this can be determined by measuring the free acid in the digestion slurry to determine the extent of reaction with the clay minerals.

When acid activation has been completed, the acid treated clay is separated from a majority of the acid solution and then washed. Both steps of separating the acid treated clay from the acid solution and the washing of the acid treated clay can be achieved in a filter press. In accordance with a preferred embodiment of the present invention, the slurry of acid activated clay in the acid activation solution is pumped, while hot, to a chamber-type filter press having open drainage to extract the acid solution or mother liquor while filling the filter press chambers with the acid activated clay. The flow rate of the acid solution decreases when the chambers of the filter press are filled as a signal to stop the flow of acid activated clay into a filter press and to begin introducing wash water through the filter press. Generally, the filter press chambers are washed with wash water introduced at a pressure of about 20 to 50 pounds per square inch maintained until washing is complete. Washing the acid activated clay removes excess acid, dissolved iron, aluminum, magnesium, and calcium ions and other clay contaminants. The end of the washing step may be determined by monitoring the filtrate from each filtered chamber such as for pH, residual chlorides, and the like to determine when substantially clean water is being removed as a filtrate. Generally, washing is complete when the filtrate has a pH of about 2.5 to about 4 and, to achieve the full advantage of the present invention, the pH of the filtrate water should be in the range of about 3 to 3.5 as an indication that washing of the acid activated clay is complete. If residual chlorides are monitored to determine the completion of clay washing, the chlorides should be at a level of less than about 500 parts per million in the filtrate and preferably less than about 400 parts per million.

In accordance with an important advantage of the present invention, the hardened, pulverized or ground clay materials, rendered non-sticky and porous in the acid-hydration step of the process, results in a relatively porous, non-compacting filter cake having the capacity of much faster filtration and washing under relatively low wash water pressures to achieve more effective diffusion-type washing in the filter press.

In accordance with another important advantage of the process of the present invention, because of the physical nature of the clay particles resulting from the extrusion and acid activation steps, the filtered material retains less water than prior art filtered material when subjected to the same filtering apparatus. For example, in a chamber type filter press, the filter cake, when processed in accordance with the present invention includes about 45 to 55% by weight water compared to filter cakes which contain 60 to 65% by weight water if the same raw material is initially contacted and dispersed in water before adding acid to the slurry.

In accordance with another important advantage of the process of the present invention, the filter cake obtained is hardened and non-sticky so that it is easily charged to a drying apparatus with substantially no agglomeration of fine or recycling to the dryer necessary.

In order to show the new and unexpected results achieved by extruding clay prior to acid-activation compared to clays acid-activated without prior extrusion, a number of different clays were compared for their ability to bleach oil-containing, oil-soluble colorant materials as well as their ability to be filtered rapidly, with and without extrusion prior to acid activation. As shown in the following Table I, extruded and acid-activated clay was compared to acid-activated clay, without extrusion, at various stages of washing for comparison of the effectiveness of the clays in decolorizing colorant-contaminated oils and to determine the filtration rate:

TABLE I

| | Bleaching Dosage .5% Absorbence | Filter Rate ml. oil/min. | Sieve Analysis % Passing | Moisture |
|---|---|---|---|---|
| ABERDEEN 1 acid activated, washed, dried and ground in lab | 1.48 | 22.0 | 100 97.5% 200 89.1% 325 70.5% | 11.33% |
| MALAYSIAN 1 extruded, acid activated, washed, dried and ground in lab | 1.45 | 10.5 | 100 99.9% 200 98.8% 325 88.2% | 12.54% |
| ABERDEEN 2 acid activated and washed in plant; dried and ground in lab | 1.00 | 16.2 | 100 99.9% 200 98.5% 325 92.1% | 13.28% |
| ABERDEEN 2.1 acid activated and washed in plant; dried and ground in lab | 1.35 | 23.5 | 100 99.9% 200 92.1% 325 70.0% | 15.71% |
| MALAYSIAN 2 extruded, acid activated and washed in plant; dried and ground in lab | 0.345 | 11.5 | 100 99.9% 200 98.0% 325 85.1% | 15.98% |
| ABERDEEN 3 acid activated, washed, dried and ground in plant | 0.82 | 22.0 | 100 99.5% 200 96.2% 325 85.6% | 13.69% |

TABLE I-continued

| | Bleaching Dosage .5% Absorbence | Filter Rate ml. oil/min. | Sieve Analysis % Passing | Moisture |
|---|---|---|---|---|
| MALAYSIAN 3 extruded, acid activated, washed, dried and ground in plant | 0.480 | 13.7 | 100 99.8%<br>200 92.6%<br>325 72.2% | 10.96% |
| Competitor's Product acid-activated without extrusions | <1.50 | 12.7 | 100 99.4%<br>200 92.6%<br>325 82.4% | 16.15% |

The first two materials shown in Table I, Aberdeen 1 and Malaysian 1 were both acid activated, washed and dried and ground in the laboratory. The Malaysian 1 product was extruded in the laboratory and the Aberdeen 1 product was not. Since the washing was carried out in a Buchner funnel, incapable of providing sufficient filtration pressure for adequate washing, the extrusion done on the Malaysian 1 product did not have a significant effect on the capacity of the clay to absorb the water-soluble colorant materials from the oil so that the absorbence of both products were approximately the same with a slight improvement due to extrusion. The filtration rate, however, for the approximately same sieve analysis, was substantially improved for the extruded material (Malaysian 1) by more than doubling the filtration capacity after extrusion compared to the approximately same material which was not extruded. Comparing the Aberdeen 2 to the Malaysian 2 material, differing only in that the Malaysian 2 was extruded, both being acid-activated and washed in the plant, where the water pressure through the filter press was substantially increased compared to that available in the laboratory, the water-soluble colorant materials remaining in the acid activated clay which was not extruded (Aberdeen 2) was approximately 65% more than that remaining in the Malaysian 2 product which had been extruded. Further, the filtration rate for the extruded material (Malaysian 2) was substantially improved over the Aberdeen 2 material which had not been extruded. A comparison of the materials which were processed start to finish in the plant (Aberdeen 3 vs. Malaysian 3) shows that the material that was extruded (Malaysian 3) compared to the material that was not extruded (Aberdeen 3) showed a significant and unexpected improvement of more than 41% less water-soluble colorant materials remaining in the totally plant processed material which had been extruded compared to the material which was not extruded. A comparison of applicant's processed material which had been both acid activated and extruded compared to a competitor's product which was acid activated without extrusion (Malaysian 2 and Malaysian 3 vs. the competitor's product) shows more than a 300% lower absorbence than that of the competitor's product. These results are most surprising and unexpected in this art.

It should be understood that the present disclosure has been made only by way of preferred embodiment and that numerous changes in details of construction, combination and arrangement of parts may be resorted to without departing from the spirit and scope of the invention as hereinunder claimed.

What is claimed and sought to be secured by Letters Patent of the United States is:

1. A method of processing clay to provide the clay with increased effectiveness in filtering contaminants from a liquid for removal of said contaminants from the liquid comprising
   extruding the clay through one or more die openings;
   grinding the extruded clay prior to adding the clay to an aqueous acid solution;
   adding the clay to an aqueous acid solution to form a clay slurry;
   agitating the clay slurry for a time sufficient and at a temperature sufficient so that the acid interacts with the clay to beneficiate the contaminant filtration characteristics of said clay to form an acid treated clay;
   separating the acid treated clay from a majority of the acid solution;
   washing the acid treated clay with a suitable acid-diluting liquid to remove most of the acid solution from the clay and form a washed, acid treated clay;
   filtering the washed, acid treated clay to remove a portion of the diluting liquid from the clay; and
   drying the acid treated clay to a desired liquid content.

2. The method of claim 1 wherein the acid solution is an aqueous solution of HCl at a concentration of 12 to 25% by weight.

3. The method of claim 1 wherein the acid solution is an aqueous solution of $H_2SO_4$ at a concentration of 10 to 35% by weight.

4. The method of claim 1 including grinding the clay so that at least 90% by weight of the ground clay particles have a particle size of 5 to 100 microns.

5. The method of claim 1 including grinding the clay so that at least 95% of the clay particles have a particle size of 5 to 400 microns.

6. The method of claim 1 wherein the clay, after filtration, has a liquid content of 20 to 45% by weight.

7. The method of claim 1 wherein the clay slurry has a clay solids content of 30 to 45% by weight.

8. The method of claim 1 wherein the clay slurry is heated, with agitation, at a temperature of 80° to 100° C. for at least 3 hours to beneficiate the contaminant filtration characteristics of the clay.

9. The method of claim 1 wherein the acid treated clay is dryed to a moisture content of 25% by weight or less.

10. The method of claim 9 wherein the clay is dryed to a moisture content of 10–18% by weight 11. The method of claim 1 wherein the acid treated clay is separated from the acid solution in a filter press to form a clay cake having a 40 to 50% by weight solids content; the clay cake then is washed with water in the filter press for a time sufficient to achieve a wet clay cake having a pH of 2.5 to 4.0; and thereafter the wet clay cake is further dewatered in the filter press to a solids content of 45 to 55% by weight, prior to drying.

12. A method of treating clay with an acid solution, prior to any substantial wetting of the clay without acid, to increase the effectiveness of said clay to absorb soluble coloring compounds from oil, comprising:
   drying the clay to a water content less than about 25% by weight;
   extruding the clay through one or more die openings to align and partially separate the platelets of the clay;
   grinding the clay to a final particle size distribution wherein at least 80% of the ground clay, on a dry weight basis, passes through a 200 mesh screen, and less than 5%, on a dry weight basis, is finer than 5 microns;

forming an aqueous acid solution having an acid concentration of 10 to 35% by weight acid;

adding the clay, having a water content less than about 25% by weight, to said acid solution to form a clay slurry having a clay content of 20 to 45% by weight dry solids;

agitating the clay slurry for a time sufficient and at a temperature sufficient to achieve sufficient mass transfer between the clay and the acid solution to improve the absorption capacity of the clay for oil soluble coloring compounds;

removing a majority of the acid solution from the clay slurry;

washing the acid treated clay with water to remove most of the acid solution from the clay;

dewatering the acid treated clay to a solids content of at least 40% by weight; and drying the acid treated clay to a solids content of at least 80% by weight.

13. The method of claim 12 including grinding the clay to a final particle size distribution wherein at least 80% of the ground clay, on a dry weight basis, passes through a 200 mesh screen, and less than 5%, on a dry weight basis, is finer than 5 microns.

14. The method of claim 13 including grinding the clay so that at least 90% by weight of the ground clay particles have a particle size of 5 to 100 microns.

15. The method of claim 13 including grinding the clay so that at least 95% of the clay particles have a particle size of 5 to 400 microns.

* * * * *